Patented Sept. 21, 1926.

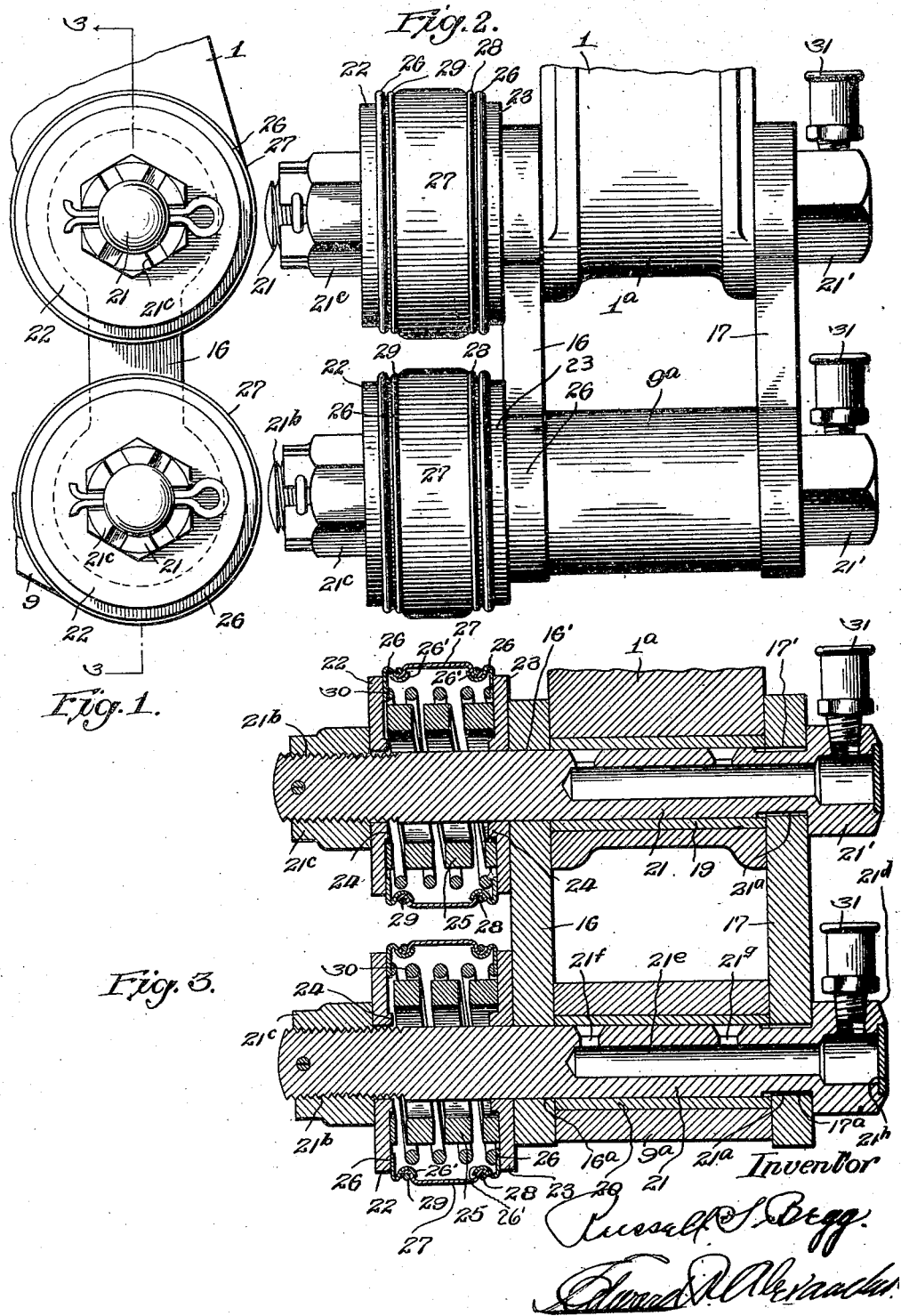
Sept. 21, 1926.
R. S. BEGG
SPRING SHACKLING MECHANISM
Original Filed Dec. 16, 1920
1,600,954

1,600,954

UNITED STATES PATENT OFFICE.

RUSSELL S. BEGG, OF CLEVELAND, OHIO, ASSIGNOR TO THE UNION TRUST COMPANY, OF CLEVELAND, OHIO, A CORPORATION OF OHIO.

SPRING-SHACKLING MECHANISM.

Original application filed December 16, 1920, Serial No. 431,071. Divided and this application filed May 12, 1924, Serial No. 712,592. Renewed August 20, 1926.

This invention relates to quieting devices for motor vehicles and more particularly to the spring shackling.

An object of my invention is to provide a construction for spring shackling for passenger motor vehicles in particular which will be relatively cheap, of easy assembly, great durability and possessed of characteristics which will insure quiet operations of the associated parts practically indefinitely.

A further object of my invention is to provide spring shackling mechanism between the springs and frame of a motor vehicle in which wear and tear between the spring shackles and the parts to which they are pivotally connected will be automatically taken up during normal operation of the vehicle.

My present invention comprises particularly a form of spring shackling mechanism such as shown in my application, Serial No. 431,071, filed December 16, 1920, of which this application is a division.

Other objects of my invention will be clear from a description of constructions embodying it, herein selected for the purpose of illustration.

Figure 1 is an end elevation, enlarged, of a spring shackle construction embodying my invention.

Fig. 2 is a rear elevation of the parts shown in Fig. 3.

Fig. 3 is a section on the line 3—3, Fig. 1.

The shackle mechanism illustrated in the drawing comprises a pair of shackle plates 16, 17. Each of the plates 16 is formed near its upper end with a hole 16′ and near its lower end with a hole 16ª, while each of the plates 17 is formed near its upper end with a hole 17′ and near its lower end with a hole 17ª, the walls of the holes 17′, 17ª, being serrated for a purpose to be hereinafter described. At its rear end each side frame member carries a tubular section 1ª which may be suitably bushed with a bushing 19. The rear end of each spring is formed into a tubular portion 9ª which likewise may be provided with a suitable bushing 20. The tubular part 1ª of the frame and portion 9ª of the adjacent rear spring are arranged in vertical alignment with each other, preferably with a shackle plate 17 in engagement therewith and on the outside thereof, and a shackle plate 16 in engagement therewith and on the inside thereof, with the holes 16′, 17′ in alignment with the hole through the bushing 19 and the holes 16ª, 17ª, in alignment with the hole through the bushing 20.

21 are bolts each having a head 21′, a knurled section 21ª, and a screw-threaded section 21ᵇ. One of these bolts is extended through the hole 17′, the bushing 19 and hole 16′ and another of them is extended through the hole 17ª, bushing 20 and hole 16ª, the inner walls of the heads 21′ of the bolts being in engagement with the outer wall of the shackle plate 17. The free end of each bolt extends beyond the outer wall of the shackle plate 16 for a sufficient distance to allow for the mounting thereon of a pair of washers 22, 23, the latter preferably being in engagement with the outer wall of the shackle plate 16. Each of these washers is formed with a boss 24 which in the assembly on the bolt are opposed to each other. 25 is a coiled spring surrounding the bolt 21 and bearing at its inner end against the washer 23 and at its outer end against the washer 24. This spring is preferably relatively heavy and capable of withstanding considerable loads, depending upon the thrusts to which it is subjected. For example, in practice I use a spring capable of withstanding loads considerably upwards of two hundred and twenty-five pounds to the square inch. 21ᶜ is a castellated nut engaging the screw threads 21ᵇ of the bolt 21 and the outer wall of the washer 22. By screwing up on this nut, the shackle plates will be drawn into snug engagement with the walls of the section 1ª of the frame or 9ª of the spring, as the case may be, and the spring 25 may be put under compression so as to insure that all parts of the mechanism will, under all ordinary operating conditions, be held in proper operating relationship to each other and in such manner that there will be no rattling of such parts or noise made due to slapping together of the parts in the normal operation of the motor vehicle.

I prefer to encase the spring 25 and for this purpose have shown a dust shield structure comprising a pair of sheet metal cap pieces 26 each provided with an annularly grooved flange 26′, two of such pieces 26 being disposed between the washers 22, 23, with their flanges 26', 26', extending toward each other. 27 is a cylinder of flexible material such as artificial leather which extends between the cap pieces 26, 26, and has its inner end pressed into the adjacent annular recess 26' by means of a wire band 28 and its outer end similarly pressed into the adjacent annular recess 26' by another wire band 29. 30 is a coiled spring bearing at its inner end against the innermost cap piece 26 and at its outer end against the outermost cap piece 26 and serving to hold the said pieces in engagement with the adjacent washers 23, 22, respectively, in the normal operation of the device.

In order to prevent each bolt turning with relation to the shackle plates and to provide that they and the bolt will oscillate in normal action with relation to the associated bushing 19 or 20, as the case may be, the serrations of the knurled section 21ª of the bolt are intermeshed with the serrations of the portions 17' or 17ª, as the case may be, of the shackle plate 17. Each bolt 21 may be provided with an oiling system as by means of a hole 21ᵈ formed in the bolt head communicating at its inner end with a hole 21ᵉ disposed longitudinally in the bolt from which lead ducts 21ᶠ, 21ᵍ. A suitable oil receiving device of any well known character, such as the one illustrated at 31, may be fitted into the hole 21ᵈ and the outer end of the hole 21ᵉ may be closed by a plug 21ʰ.

With a chassis mounted as hereinbefore described, I have found that the shackling mechanism will remain quiet in actual practice under the most severe conditions and that the mechanism is peculiarly advantageous for bringing about the desired quietness of operation in passenger cars in particular and furthermore that the riding qualities of the chassis are greatly enhanced.

It will be further noted that the joints between the shackles and the eyes in my improved construction are maintained substantially lubricant-tight and dustproof, which is of distinct advantage in insuring the prolonged life of the parts and their quiet operation.

It will be further noted that under the influence of the action of the springs, the spring shackles and the eyes to which they are connected at their opposite ends are maintained in frictional resistance so as to produce a snubbing or shock absorbing action between these parts in the normal operation of the vehicle.

Furthermore, it will be noted that the locking together of the shackles and correlated eyes by the screwing up of the nuts, as occurs so commonly with the usual bolt and nut connections for these parts, is substantially precluded, the springs serving largely to prevent such locking together.

To those skilled in the art of making mechanism of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In vehicle spring shackling mechanism, the combination with shackle plates and a shackle bolt, of members mounted on the bolt and at the side of a shackle plate remote from the vehicle spring, a spring surrounding said bolt and mounted intermediate said members, a nut on said bolt disposed so that upon tightening of said nut it will press said members toward the shackle plate, and flexible means cooperating with said members to enclose said springs, said means being adapted to permit relative movement of said members.

2. In spring shackling mechanism, the combination with a shackle bolt, of washers mounted thereon, a spring interposed between said washers and surrounding said bolt, a nut disposed on said bolt and engaging one of said washers to compress the spring, and flexible means cooperating with said washers and forming therewith a substantially tight enclosure about said spring.

3. Vehicle spring shackling mechanism comprising spaced washers having aligned openings therein adapted to receive a shackle bolt, a relatively heavy spring interposed between said washers and surrounding said openings, and a flexible, dust-proof, enclosing member cooperating with said washers and secured thereto.

4. In spring shackling mechanism, the combination of a shackle bolt and nut therefor, a shackle plate, a pair of washers having aligned bolt receiving apertures therein, a relatively heavy spring disposed around said bolt and between said washers, cap members engaging the opposing faces of said washers, a second spring surrounding said first spring and holding said cap members in engagement with the opposing faces of the washers, and a flexible, dust-proof, cover member secured to said cap pieces.

5. In spring shackling mechanism, the combination of a shackle bolt and shackle plates, a pair of washers having apertures therein to engage said bolt, a relatively heavy spring surrounding said bolt and disposed between said washers, a nut mounted on the threaded end of said bolt and adapted to compress said spring, a relatively light spring interposed between said washers and surrounding said heavy spring, and means forming with said washers a substantially tight enclosure.

6. An anti-rattling device comprising spaced washer members provided with aligned openings, one of said washer members provided with an annular recess, a coil spring, one end of said coil spring bearing against one of said washers and the other end of said coil spring seating in said annular recess of the other of said washers, a second coil spring interposed between said washers and encircling said first named coil spring, and a flexible container cooperating with said washers and enclosing said springs, substantially as described.

7. In an anti-rattling device of the character described, spaced washer members having aligned openings therein, coil springs interposed between said washer members, one spring encircling the other and a container member cooperating with said washer members and enclosing said springs, substantially as described.

In testimony whereof I hereunto affix my signature.

RUSSELL S. BEGG.